(12) United States Patent
Schermerhorn

(10) Patent No.: US 6,744,488 B2
(45) Date of Patent: Jun. 1, 2004

(54) OLFACTORY SPECIAL EFFECTS SYSTEM

(75) Inventor: James G. Schermerhorn, Boulder, CO (US)

(73) Assignee: JCT Technologies, LLC, Boulder, CO (US)

(*) Notice: Subject to any disclaimer, the term of this patent is extended or adjusted under 35 U.S.C. 154(b) by 0 days.

(21) Appl. No.: 10/148,972

(22) PCT Filed: Dec. 7, 2000

(86) PCT No.: PCT/US00/33377

§ 371 (c)(1),
(2), (4) Date: Sep. 30, 2002

(87) PCT Pub. No.: WO01/42852

PCT Pub. Date: Jun. 14, 2001

(65) Prior Publication Data

US 2003/0223040 A1 Dec. 4, 2003

Related U.S. Application Data

(60) Provisional application No. 60/169,416, filed on Dec. 7, 1999.

(51) Int. Cl.⁷ .............................................. G03B 21/32
(52) U.S. Cl. ................................................... 352/85
(58) Field of Search .......................................... 352/85

(56) References Cited

U.S. PATENT DOCUMENTS

| | | |
|---|---|---|
| 2,144,190 A | 1/1939 | Merz |
| 2,540,144 A | 2/1951 | Stern |
| 2,562,959 A | 8/1951 | Stern |
| 2,562,960 A | 8/1951 | Stern |
| 2,813,452 A | 11/1957 | Laube |
| 2,905,049 A | 9/1959 | Laube |
| 3,795,438 A | 3/1974 | Westenholz et al. |
| 4,603,030 A | 7/1986 | McCarthy |
| 4,838,311 A | 6/1989 | Vetter |
| 4,838,344 A | 6/1989 | Murakami |
| 4,919,197 A | 4/1990 | Murakami |
| 5,069,876 A | 12/1991 | Oshinsky |
| 5,398,070 A | 3/1995 | Lee |
| 5,610,674 A | 3/1997 | Martin |
| 5,760,873 A | 6/1998 | Wittek |
| 5,832,320 A | 11/1998 | Wittek |
| 5,898,475 A | 4/1999 | Martin |
| 5,963,302 A | 10/1999 | Wittek |
| 6,024,783 A * | 2/2000 | Budman ................... 96/222 |
| 6,282,458 B1 * | 8/2001 | Murayama et al. ......... 700/239 |

* cited by examiner

Primary Examiner—Rodney Fuller
(74) Attorney, Agent, or Firm—MacMillan, Sobanski & Todd, LLC

(57) ABSTRACT

An olfactory special effects system includes a plurality of scent cartridges that contain respective substances for generating different scents. The system also includes a scent delivery unit having a plurality of compartments to contain the scent cartridges, a device that generates an airflow, and a mechanism that moves the scent cartridges from the compartments into the airflow to create a scented airflow. The scent delivery unit also includes a controller that controls the mechanism to move different scent cartridges at different times during the presentation in order to release different scents in response to cues from the presentation. The olfactory special effects system also includes a scent outlet vent to deliver the scented airflow to the audience members. The system further includes a scent ductwork to channel the scented airflow from the scent delivery unit to the scent outlet vent.

13 Claims, 4 Drawing Sheets

US 6,744,488 B2

OLFACTORY SPECIAL EFFECTS SYSTEM

CROSS-REFERENCE TO RELATED APPLICATION

This application claims the benefit of U.S. Provisional Application No. 60/169,416, filed Dec. 7, 1999, the disclosure of which is incorporated herein by reference.

BACKGROUND OF THE INVENTION

This invention relates in general to special effects systems and in particular to an olfactory special effects system for motion pictures or other presentations.

Over the last twenty years, the motion picture industry has spent a significant amount of money to develop and incorporate special audio and visual effects in motion pictures. Some of the most successful motion pictures have been the ones that instill an emotional reaction or rekindle a memory in the audience. To date, however, the sense of smell has been virtually ignored as a method to accomplish these ends. With the ever-increasing competition of alternative entertainment venues, the movie exhibition industry will need a revolutionary way to entice the public to take the time and spend the money to attend the movies.

U.S. Pat. No. 5,832,320 to Wittek discloses an olfactory special effects system for motion pictures that attempts to accomplish the above-mentioned objectives. Unfortunately, the system described in the patent is not economically feasible. The system requires that each seat in each movie theater be modified to accommodate the scent delivery to the audience. An additional cost prohibitive element of the system is that each movie print in existence has to be modified to include numerous cueing strips throughout the print which trigger a scent switch box to change aromas. Yet another drawback of the system is that it uses compressed air that is noisy and detracts from the audio portion of the movie. In short, retrofitting a movie theater to accommodate the system described in the patent would be both too costly for theater owners and too distracting to the audience.

SUMMARY OF THE INVENTION

This invention relates to an olfactory special effects system for delivering scents to an audience during a motion picture or other presentation. The system includes a plurality of scent cartridges that contain respective substances for generating different scents. The system also includes a scent delivery unit having a plurality of compartments to contain the scent cartridges. The scent delivery unit further includes a device that generates an airflow and a mechanism that moves the scent cartridges individually from the compartments into the airflow to release their scents and create a scented airflow. The scent delivery unit also includes a controller that controls the mechanism to move different scent cartridges at different times during the presentation in order to release different scents in response to cues from the presentation. The olfactory special effects system also includes a scent outlet vent to deliver the scented airflow to the audience members. The system further includes a scent ductwork to channel the scented airflow from the scent delivery unit to the scent outlet vent.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
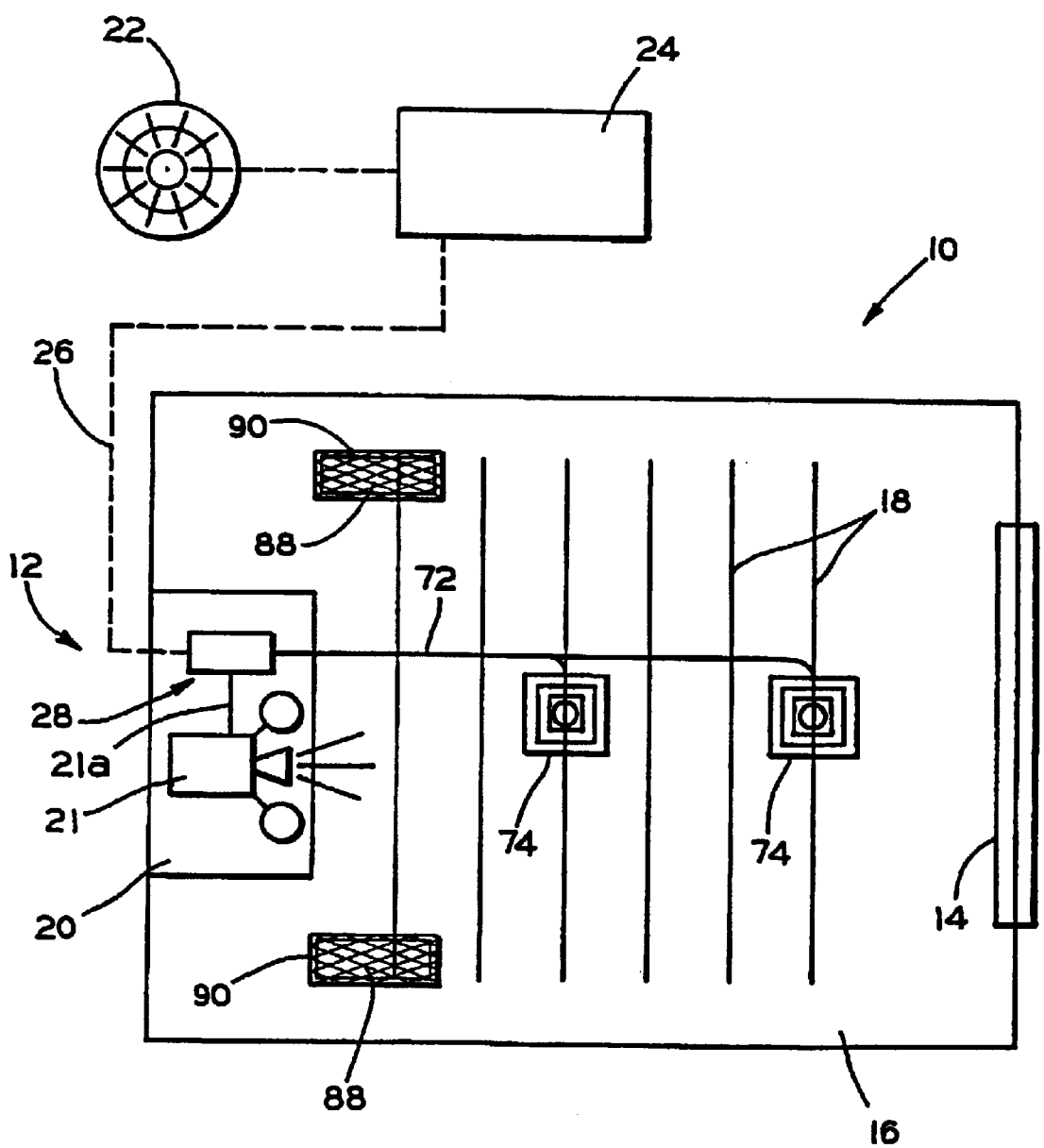
FIG. 1 is a schematic top plan view of a movie theater that is equipped with an olfactory special effects system in accordance with this invention.

Referring now to the drawings, there is schematically illustrated in FIG. 1 a portion of a movie theater, indicated generally at 10, that is equipped with an olfactory special effects system, indicated generally at 12, in accordance with this invention. The movie theater 10 is generally conventional in the art, including a movie screen 14 that is provided within a room or auditorium 16 containing a plurality rows of seats 18 for an audience. A projection booth 20 containing a movie projector 21 is provided within the theater 10. Although the olfactory special effects system 12 of this invention will be described in the context of the illustrated movie theater 10, it will be appreciated that the olfactory special effects system 12 of this invention may be used for delivering scents to an audience during any other type of visual and/or audio presentation. For example, the olfactory special effects system 12 of this invention may be used for delivering scents to an audience during presentations may by videos, DVD's, television, digital projectors, or any other type of presentation medium.

As shown schematically in FIG. 1, the filming, editing, and other production aspects involved in the creation of a motion picture results in the creation of a tangible medium of expression in or on which the visual and audio aspects of the motion picture are recorded or otherwise stored. For example, the motion picture may be embodied in a conventional reel of celluloid film 22. However, as mentioned above, it will be appreciated that this invention may be practiced with any type of presentation that is embodied in any tangible medium of expression.

As is well known, the reel of film 22 or other tangible medium of expression is typically provided with a timing cue system that relates a series of numeric or other predetermined designations to the visual and audio aspects of the motion picture. For example, most reels of film 22 that are produced today are provided with a conventional SMPTE (Society of Motion Picture and Television Engineers) time code. The SMPTE time code is a universal digital specification that is recorded along the edge of or within the reel of film 22. This digital signal assigns a number to every frame of the motion picture and can be representative of time (hours, minutes, seconds, etc.), frame number of the reel of film 22, or any other user-specified information, such as take number. The SMPTE time code is not displayed when the reel of film 22 is projected at the movie theater 12, but rather is invisible to the audience. However, for the reasons set forth below, the projector 21 or other device generates an output signal (such as a digital electrical signal, for example) on a line 21a that is representative of such time code as the reel of film 22 is being displayed in the movie theater 10. Any suitable timing cue system may be used in connection with this invention.

Regardless of the specific nature of the timing cue system, the reel of film 22 or other tangible medium of expression containing that timing cue system is taken to a post-production facility 24, where a "scent track" in accordance with this invention is created. Generally speaking, the scent track is created by the producer, director, or other personnel to define the nature and timing of scents that are to be presented to the audience viewing the motion picture. The scent track can define a variety of characteristics for the use of such scents in conjunction with the visual and audio aspects of the motion picture, including the start and stop times of such scents, which of a plurality of scents should be used, how intense the scents should be, and any other desired characteristics. Each of the scent characteristics of the scent track is preferably related to the visual and audio aspects of the motion picture by means of the timing cue system. Thus, the scent track relates the presentation of scents to the audience in the movie theater 10 as the reel of film 22 is being displayed.

The scent track is preferably recorded on a tangible medium of expression that is separate from the reel of film 22 or other medium containing the motion picture. Preferably, the scent track is a series of digital electrical signals correlating each scent to be presented to the audience during the display of the motion picture with the SMPTE time code or other timing cue system and, therefore, the visual and audio aspects of the motion picture. In a preferred embodiment, the scent track is stored in a conventional electronic memory device, such as a hard disk, a floppy disk, or a magnetic tape, for example. As will be explained in greater detail below, the scent track can be transmitted or delivered to the projection booth 20 or other control center of the movie theater 10 for use when the reel of film 24 is displayed. Preferably, however, the scent track is transmitted to the movie theater 10 by an electronic transmission medium 26, such as by telephone, cable modem, or satellite feed. The use of a wireless connection, troubleshooting of the olfactory special effects system 12 can be done remotely, and the system 12 can be audited for licensing revenue as well.

The scent track can be received and/or stored in a scent delivery unit, indicated generally at 28, that preferably is located inside the projection booth 20 or other control center of the movie theater 10. The structure of the scent delivery unit 28 is shown in detail in FIG. 2. As shown therein, the scent delivery unit 28 includes a housing 30 containing a plurality of scent compartments 32 formed or otherwise defined therein. In the illustrated embodiment, ten of such scent compartments 32 are provided within the housing 30. However, any desired number of scent compartments 32 may be provided. Each of the scent compartments 32 has an outer hatch 34 and an inner hatch 36 that can be selectively opened and closed for the reasons set forth below. Preferably, the scent compartments 32 are capable of being secured in an airtight condition when the outer hatches 34 and the inner hatches 36 are closed.

The scent delivery unit 28 of the olfactory special effects system 12 also includes a plurality of scent cartridges 38 that are individually disposed with the scent compartments 32. Each of the scent cartridges 38 can be inserted into its respective scent compartment 32 by opening the associated outer hatch 34, inserting the scent cartridge 38 within the scent compartment 32, and closing the outer hatch 34. Preferably, the scent cartridges 38 are kept in airtight packages until they are used to minimize dilution of the scents. The airtight scent compartments 32 also reduce the rate at which the scents are diluted over time.

Each of the scent cartridges 38 contains a material that generates a particular scent that is to be presented to the audience viewing the motion picture. Preferably, the scent cartridges 38 contain different materials that generate different scents, although such is not necessary. As will be explained in greater detail below, the materials contained within the scent cartridges 38 represent scents that correspond with particular scenes contained within the motion picture. The scents generated by the scent cartridges 38 may be scene specific, i.e., specially created for use with specific portions of the motion picture. Alternatively, the scents generated by the scent cartridges 38 may be generic, i.e., created for use with any genre that is commonly found in motion pictures in general. For example, the scents can range from environmental smells (such as those associated with restaurants, landfills, tire stores, subways, etc.) to simple "mono-scents" such as the smell of a rose. The scents can include both pleasant and unpleasant odors. It is estimated that it may be desirable to use no more than ten different scents during a typical motion picture.

The materials contained in the scent cartridges 38 may be composed of any desired individual chemicals or combinations of different chemicals. The types of chemicals present in the scents can be determined by any suitable method. In a preferred method, the chemicals are determined by gas chromatography-olfactory. In this method, an air sample is taken from an environmental location by vacuuming the ambient air into a vessel filled with an absorbent material. The sample is then taken to a laboratory equipped with a gas chromatography-olfactory system. An example of such a system is the CharmAnalysis system available from DATU, Inc., Geneva, N.Y. In this system, an inert gas is pumped through the absorbent material and into the CharmAnalysis gas chromatograph. The CharmAnalysis program analyzes what chemicals are present in the air sample and their relative intensity. The CharmAnalysis system provides a graphic analysis of the chemicals' relative concentrations, retention indexes, dilution values, and the like. From the data provided by the CharmAnalysis system, all the chemicals, in their respective concentrations, are reproduced in the scent cartridges 38 in order to duplicate the environmental scent desired. The chemicals used in the scent cartridges 38 can be obtained commercially from any of a number of companies that sell chemicals to the flavor/fragrance industry, such as Oxford Chemicals, Hartlepool, United Kingdom.

The chemicals or other materials can be releasably contained within the scent cartridges 38 in any suitable manner. In a preferred embodiment, the scent cartridge 38 has a porous structure that allows air to flow therethrough, similar to the construction of an air filter for a home furnace. The porous structure of the scent cartridge 38 is coated with the appropriate chemicals to create a desired scent. When air flows through the scent cartridge 38, the scent is released from the porous material into the airflow. Preferably, the scent is released gradually and relatively slowly from the scent cartridge 38 into the airflow. Any suitable method can be used to achieve the gradual release of the scent. In a preferred method, the scent cartridge 38 is coated with a gradual release agent such as a paraffin compound, and the scent is imbedded in the paraffin compound. The paraffin compound dilutes and releases more of the chemicals as time elapses. This prolongs the life of the scent cartridge 38 and retains its scent characteristics. The gradual release mechanism of the scent cartridge 38 is similar to that of a home air freshener such as FifterFresh, which is manufactured by Web Products, inc.

Preferably, the scent cartridges 38 include an identifying feature to differentiate the scent cartridges 38 from one another, and the scent delivery unit 28 includes a device (not shown) to read the identifying features in order to match the correct scent cartridges 38 with the corresponding scent compartments 32. In a preferred embodiment, the scent cartridges 38 are provided with a conventional bar code or other mechanism that is capable of being read or other sensed by a sensing device. The sensing device of the scent delivery unit 28 can be a conventional bar code reader or similar device that determines from the bar code or other identifying feature which scent cartridge 38 is disposed in the scent compartments 32. The scent delivery unit 28 may also include a mechanism (not shown) to disable the unit 28 if a scent cartridge 38 is placed into an incorrect scent compartment 32.

In a preferred embodiment, the scent delivery unit 28 also includes a filter compartment 40 within which an air filter 42 is disposed. The filter compartment 40 has an outer hatch 44 and an inner hatch 46 which can be selectively opened and closed. The air filter 42 may be embodied as any conventional structure that is suitable for removing scents from the air can be used, such as a charcoal filter. The purpose of the air filter 42 will be described in more detail below.

The scent delivery unit 28 further includes a device 48 adapted to generate an airflow through the scent cartridges 38. As described in more detail below, the airflow carries the scents from the scent cartridges 38 to the audience during presentation of the motion picture. Any device suitable for this purpose can be used in the scent delivery unit 28, such as one of a number of different types of fans. In the illustrated embodiment, the device 48 is a conventional centrifugal fan that is mounted inside the housing 30 near the bottom of the scent delivery unit 28. Preferably, the centrifugal fan 48 is driven by a conventional variable speed A.C. motor.

In the illustrated embodiment, the airflow from the centrifugal fan 48 is directed through a duct 50 or other path formed through the housing 30 that extends along the inner portions of the scent compartments 32. The duct 50 has an inlet 52 that communicates with the outlet of the centrifugal fan 48 and an outlet 54 that communication with an outlet port from the housing 30. The illustrated duct 50 has a side 56 that extends adjacent to the scent compartments 32 and has openings (not shown) formed therethrough that are aligned with the inner hatches 34 of the scent compartments 32.

The scent delivery unit 28 also includes a mechanism for selectively extending each of the scent cartridges 38 individually from the respective scent compartments 32 into the interior of the duct 50 and, therefore, the airflow created by the centrifugal fan 48. When each scent cartridge 38 is moved into such airflow, it releases its scent to create a scented airflow. The mechanism is also adapted to retract the scent cartridges 38 back from the airflow into the scent compartments 32 when it is desired to cease the generation of the scented airflow. Any suitable mechanism can be used for selectively extending and retracting the scent cartridges for this purpose. In the illustrated embodiment, such mechanism includes a plurality of trays 58, within which the scent cartridges 38 are respectively supported. The scent trays 58 are movable back and forth between the scent compartments 32 and the interior of the duct 50, through which the airflow passes. To accomplish this, the scent trays 58 move through the inner hatches 36 of the scent compartments 32 and the corresponding openings in the side 56 of the duct 50. The mechanism can include any suitable means for moving the scent trays 58. Preferably, the scent trays 58 are moved by means of a screw type linear actuator (not shown), such as those manufactured by Hayden Switch and Instrument, Inc. of Waterbury, Conn. Preferably, the linear actuator includes a sub-fractional horsepower stepper motor with programmable variable speed. The scent delivery unit 28 may include "in use" lights (not shown) that indicate when the scent cartridges 38 have been moved into the airflow, and "refill" lights (not shown) that indicate when the scent trays 58 do not contain scent cartridges 38.

In a preferred embodiment, the mechanism is also adapted to move the air filter 42 from the filter compartment 40 into the airflow, and from the airflow back into the filter compartment 40. Any suitable mechanism can be used for this purpose, such as a filter tray 60 that supports the air filter 42 and which is movable back and forth between the filter compartment 40 and the interior of the duct 50. The filter tray 60 can be moved by any suitable means (not shown), such as the linear actuator described above. The air filter 42 is moved into the airflow between the release of the different scents, to clean the airflow of all scents prior to the beginning of the next scent. This enhances the effectiveness of the olfactory special effects system 12. Preferably, the scent delivery unit 28 defaults to the filter tray 60 whenever a scent cartridge 38 is not in the airflow. Preferably, an air input 62 to the centrifugal fan 48 receives the scented air returning from the auditorium 16 of the movie theater 10. The air filter 42 of the scent delivery unit 28 is effective to remove much of the scents from such returning air so as to quickly remove the scents from the auditorium 16 when desired. To accomplish this, the scent delivery unit 28 may be connected to the return airflow ductwork (not shown) of the movie theater's heating, ventilating and air conditioning system.

Preferably, the scent delivery unit 28 includes a device that provides an electrical charge to the scented molecules of air that constitute the scented airflow. In the illustrated embodiment, an electromagnet 64 is provided in the duct 50 for this purpose. However, any other conventional device may be used for this purpose. As described below, the creation of an electrical charge on the molecules of the scented air in the airflow can facilitate their removal from the scented air returning from the auditorium 16 of the movie theater 10.

The scent delivery unit 28 may, if desired, further include a heater 66 or similar apparatus that is adapted to increase the temperature of the airflow passing through the duct 50 before the scents are released into the airflow. Any suitable structure may be used for the air heater 66, such as the illustrated heating coil. It may be desirable to pre-heat the airflow passing through the duct 50 so as to increase the effluence of the scents released from the scent cartridges 38 into the airflow.

As mentioned above, the projector 21 generates an output signal on a line 21a that is representative of such time code as the reel of film 22 is being displayed in the movie theater 10. The scent delivery unit 28 is adapted to receive these output signals and, in response thereto, determine when the different scents should be started and stopped. To accomplish this, the illustrated scent delivery unit 28 includes a SMPTE time code reader 68 or similar device that receives and decodes the SMPTE time code signal generated from the projector 21. The Preferably, the time code reader 68 sends out electrical signals, such as one-volt GPI (General Purpose Interface) outputs, at the predetermined times programmed on the scent track of the motion picture 22.

The output signals from the SMPTE time code reader 68 are fed to a controller mechanism, such as a programmable electronic controller 70, contained within the scent delivery unit 28. The controller 70 is responsive to the decoded output signals from the SMPTE time code reader 68 for controlling the operation of the mechanism 58 for selectively extending each of the scent cartridges 38 individually from the respective scent compartments 32 into the interior of the duct 50 and, therefore, the airflow created by the centrifugal fan 48. Any one of a number of conventional structures can be used to allow the controller 70 to cause movement of the scent trays 58 in the manner described above can be used. Preferably, the controller 70 is adapted to control the movements of the scent trays 58 at variable speed. Additionally, it is desirable that the controller 70 be capable of controlling the rotational speed of the centrifugal fan 48, the movement of the air filter 42, and the operation of the air heater 66 as described above. Regardless, the controller 70 receives the signals generated from the projector 21 in response to the scent track provided on the reel of film 22 to effect movement the scent cartridges 38 into the airflow contained within the duct 50 at selected times during the performance of the motion picture.

Figure 2:
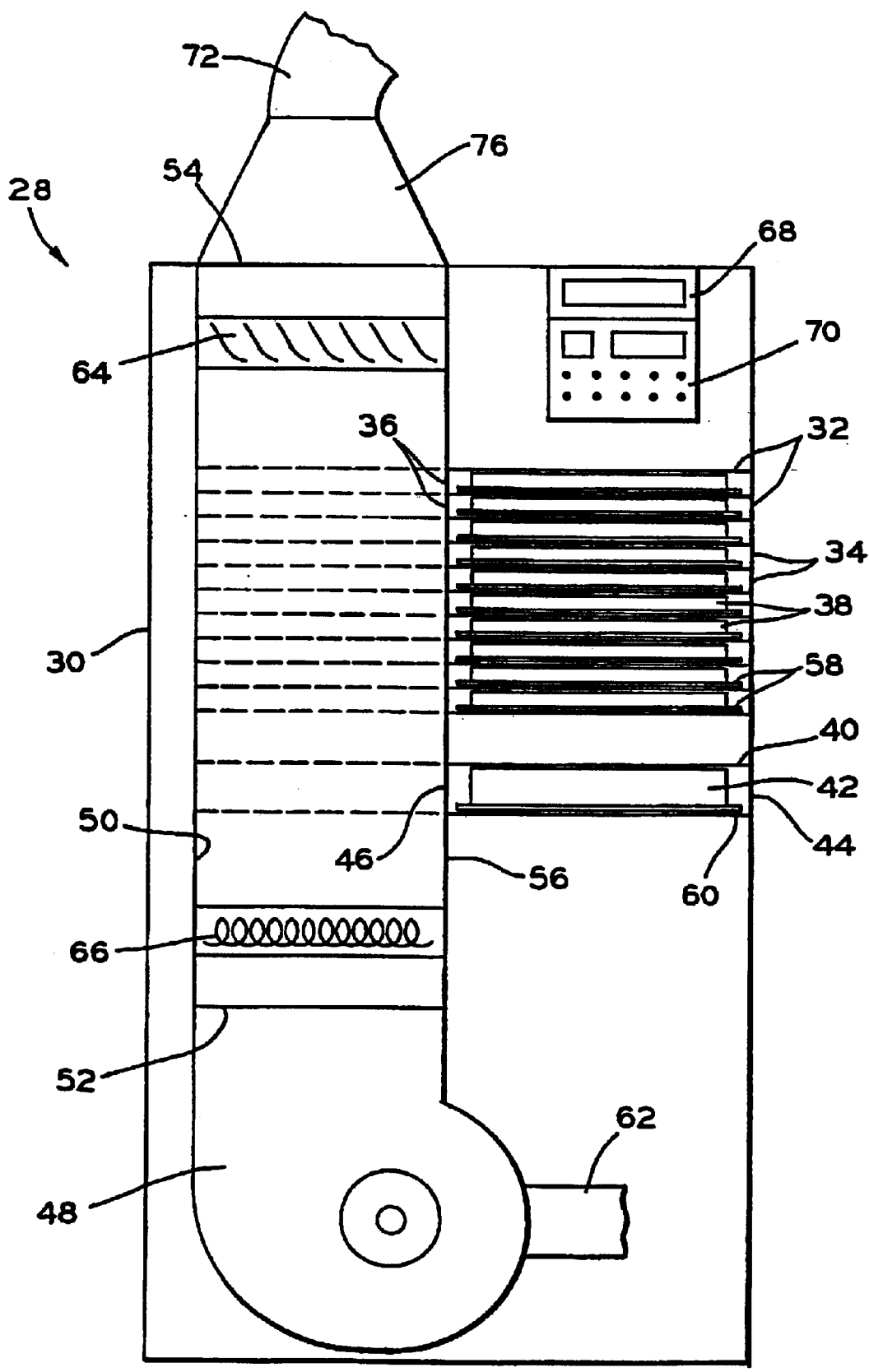
FIG. 2 is a schematic side view of a scent delivery unit of the olfactory special effects system illustrated in FIG. 1.

As shown in FIGS. 1 and 2, the scented airflow moving through the duct 50 of the scent delivery unit 28 is directed into a scent duct 72 extending throughout a portion of the auditorium 16. The scent duct 72 is provided to direct the scented airflow from the scent delivery unit 28 to one or more scent outlet vents 74, the structures of which are described in detail below. The scent duct 72 may be installed within the movie theater 10 in a manner to evenly distribute or maximize the delivery of scents throughout the auditorium 16. The scent duct 72 can be installed within the walls or the ceiling of the movie theater 10 as desired, depending on the theater construction, or may be exposed within the auditorium. The scent duct 72 can form a portion of, or be completely separate from, the existing HVAC system of the theater 10. The scent duct 72 can have any construction that is suitable for channeling the scented airflow. Preferably, the scent duct 72 is constructed as a flexible tube. The use of a flexible tube allows the scent duct 72 to be universal in application, which minimizes the cost of installation. As shown in FIG. 2, the scent duct 72 communicates with the outlet 54 of the duct 50 of the scent delivery unit 28 through a tapered plenum 76. Thus, the centrifugal fan 48 drives the airflow through the duct 50 and the tapered plenum 76 into the scent duct 72. The use of the tapered plenum 76 can accelerate the velocity of the scented airflow as it enters the scent duct 78.

Figure 3:
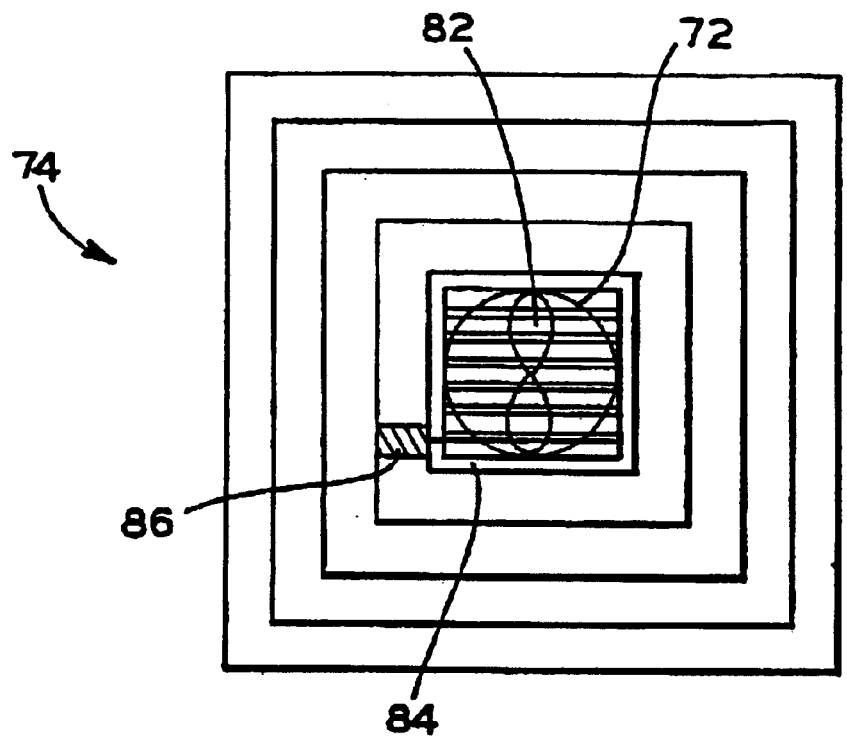
FIG. 3 is a bottom view of a first embodiment of a scent outlet vent of the olfactory special effects system illustrated in FIG. 1 that is adapted for installation in a ceiling of the movie theater.
Figure 4:
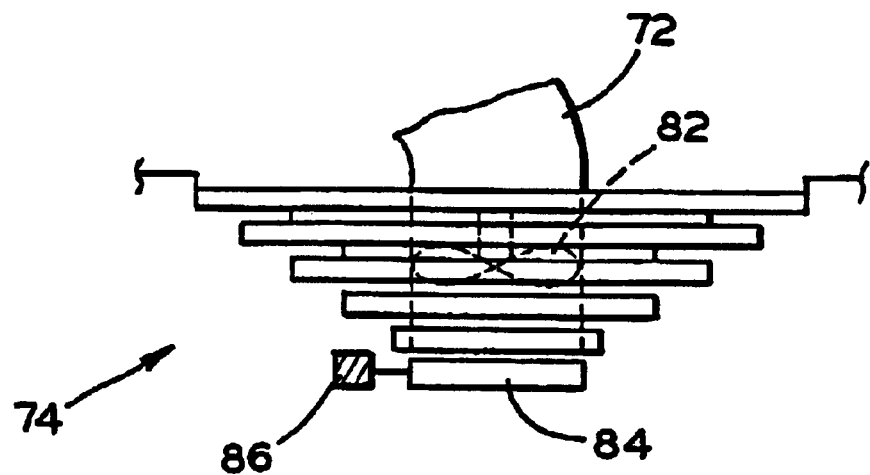
FIG. 4 is a side view of the scent outlet vent illustrated in FIG. 3.
Figure 5:
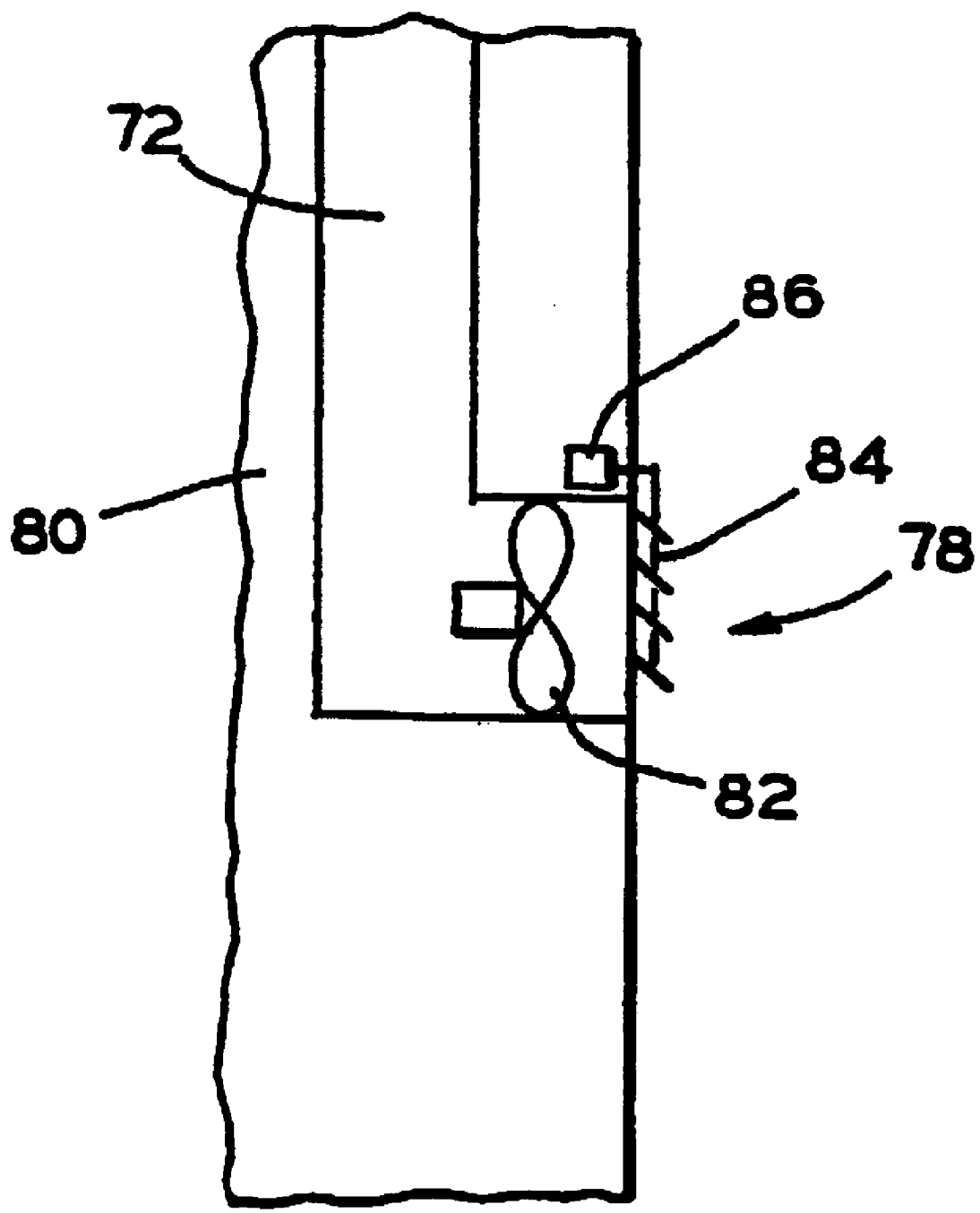
FIG. 5 is a side view of a second embodiment of a scent outlet vent of the olfactory special effects system illustrated in FIG. 1 that is adapted for installation in a wall.

As shown in FIGS. 1, 3 and 4, the scent outlet vents 74 are adapted to deliver the scented airflow from the scent duct 72 into the auditorium 16 and, therefore, to the audience members seated therein. The location and type of scent outlet vents 74 can be varied as desired, such as in accordance with the size and shape of the theater 10. The installation of scent outlet vents 74 in different theaters may be unique because of the variety of theater sizes and configurations. The olfactory special effects system 12 of this invention can include at least two different types of scent outlet vents: ceiling-mounted scent outlet vents 74, such as shown in FIGS. 3 and 4; and wall-mounted scent outlet vents 78, such as shown in FIG. 5.

In either instance, the scent outlet vents 74 and 78 can include an in-line duct fan 82. The in-line duct fan 82 may be provided to accelerate the velocity of the scented airflow into the theater auditorium 16 so that the scent can be projected to the audience in a more quick and precise manner. Any type of fan structure that is suitable for this purpose can be used. One type of suitable fan has a design similar to the Model DB310 Inductor 2-Speed In-line Duct Fan manufactured by Suncourt, Inc., Durant, Iowa.

Preferably, the scent outlet vents 74 and 78 also include a damper 84 that is mounted across the outlet thereof. The damper 84 is adapted to move between a closed position, wherein the flow of air through the associated scent outlet vent 74 or 78 is prevented, and an open position, wherein the flow of air through the associated scent outlet vent 74 or 78 is permitted. Preferably, such movements of the damper 84 are controlled by a motor 86. The dampers 84 can be closed to prevent the leakage of scents from the scent outlet vents 74 and 78 at times during the motion picture 22 when scents are not desired. The damper 84 can also be closed to allow the scent ductwork 72 to become somewhat pressurized and the upcoming scent concentrated in the scent ductwork 72 for relatively quick dispersion within the auditorium 16.

The operations of the in-line duct fans 82 and the dampers 84 may be controlled by the controller 70 of the scent delivery unit 28 in a manner that is easily within the scope of a person having ordinary skill in the art. For example, electrical wiring (not shown) extending from the controller 70 to the in-line duct fans 82 and the dampers 84 may be attached to the exterior of the scent duct 72. The wiring may carry signals from the controller 70 to turn the in-line duct fans 82 on or off, to adjust the speed of the in-line duct fans 82, and to open or close the dampers 84. The operations of the inline duct fans 82 and the dampers 84 are preferably controlled in such a manner that all audience members in the auditorium 16 experience the appropriate scents essentially simultaneously and in a coordinated manner with the visual and audio aspects of the motion picture.

If desired, preferably one or more electronic air cleaners 88 (see FIG. 1) may be installed in the return air ducts 90 of the existing HVAC system of the movie theater 10. The electronic air cleaners 88 are intended to be used in combination with the electromagnet 64 in the scent delivery unit 28. The electronic air cleaners 88 can be operated to generate an electrical charge that is reciprocal to the electrical charge provided to the scented air molecules imparted by the electromagnet 64. Because of the reverse electrical polarization, the scented air molecules contained within the auditorium 16 can be removed more quickly. The electronic air cleaners 88, in combination with the air filter 42 in the scent delivery unit 28, are thus provided to clean the air in the theater auditorium 16 of substantially all scents prior to the commencement of the next scent. Preferably, the controller 70 of the scent delivery unit 28 is adapted to control the electronic air cleaners 88.

In operation, at a predetermined time determined by the timing cue system provided on the reel of film 22, the scent track activates the scent delivery unit 28 to cause one or more of the scent cartridges 38 to be moved into the duct 50 and, therefore, the airflow created by the centrifugal fan 48 to create a scented airflow. The scented airflow is channeled through the scent duct 72 to the scent outlet vents 74 and 78. With the dampers 84 of the scent outlet vents 74 closed, the scented airflow builds up pressure at the scent outlet vents 74 and 78. At a predetermined time, the controller causes the dampers 84 to be opened, thereby cause the scented airflow to be discharged into the auditorium 16, allowing the audience members therein to experience the scent. Depending on the olfactory effect desired, the in-line duct fans 82 may or may not also be turned on to accelerate the delivery of the scent to the audience. If the auditorium 16 has a stadium design (i.e. steeply inclined seating), the dampers 84 of the scent outlet vents 74 closer to the movie screen 14 may be opened marginally ahead of those toward the rear of the auditorium 16 to insure that the scent reaches all the audience members essentially simultaneously. The ability to turn on and off the in-line duct fans 82 and the dampers 84 individually is a feature which adds to the flexibility of the olfactory special effects system 12 and its adaptation to different theater designs and environments. It also adds flexibility to the creative aspects of olfactory special effects by enabling the modification of scent intensities, speed of delivery, and dwell time.

As is true with scents found in the real world, the scent is usually perceived as a wave of sensation, not an instantaneous event. Producers and directors will determine when it is most effective to utilize scents when frequent scene changes are incorporated into the motion picture 22. In some circumstances, it may be advantageous to have a consistent scent even though the scenes are changing rapidly. Other effects can be accomplished by having scents present that are not directly visually tied to the motion picture 22. This borders on the concepts of aromatherapy, which alters moods by the presence of certain scents. For example, the scent of orange is proposed to replenish cheerfulness and could be used to restore the audience's mood after a depressing event in the motion picture 22.

Once a scent is delivered for its predetermined time, the scent cartridge 38 is retracted from the airflow back into its compartment 32. The air filter 42 of the scent delivery unit 28 is moved into the airflow to purge the scent from the system 12. Shortly thereafter, the inline duct fans 82 are shut off and the motorized dampers 84 are closed.

The olfactory special effects system 12 has the flexibility to accommodate the infinite possibilities of both the broad range of required olfactory special effects and the vast spectrum of theater designs and other venues throughout the world. Theater retrofits are relatively inexpensive with the system 12. Any motion picture 22 (past or future) can have a program created for it. The scent delivery unit 28 can be easily reprogrammed remotely via modem, satellite, or disk. Scent cartridges 38 can be developed to match the requirements of any motion picture. The scent cartridges 38 are usually relatively inexpensive in composition and design.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A system for delivering scents to an audience during a presentation containing timing signals comprising:

a scent delivery unit including a compartment containing a scent cartridge, a path, and a device adapted to generate an airflow through said path;

a mechanism for selectively moving said scent cartridge from said compartment into said path so as came the airflow to flow through said scent cartridge and thereby release its scent into the airflow to create a scented airflow; and a controller that is responsive to the timing signals of the presentation for controlling the operation of said scent cartridge moving mechanism to move said scent cartridge between said compartment and said path.

2. The system defined in claim 1 wherein said scent delivery unit further includes a filter and a mechanism for selectively moving said filter into the airflow to remove scents therefrom, said controller being responsive to the timing signals of the presentation for controlling the operation of said filter moving mechanism to move said filter into the airflow.

3. The system defined in claim 1 wherein said scent delivery unit further includes a device that electrically charges the scented airflow and an electronic air cleaner that removes the scents from the electrically charged scented airflow.

4. The system defined in claim 1 wherein said scent delivery unit further includes a heater that increases the temperature of the airflow.

5. The system defined in claim 1 wherein said scent cartridge includes a filter medium having an imbedded scent.

6. The system defined in claim 1 wherein said scent delivery unit further includes a mechanism for decoding the timing signals of the presentation and generates output signals to the controller.

7. The system defined in claim 1 further including a scent outlet vent that receives the airflow from said scent delivery unit and discharges the airflow into a space, said scent outlet vent including a damper that is operable between opened and closed positions.

8. The system defined in claim 7 wherein the operation of said damper is controlled by said controller.

9. The system defined in claim 1 further including a scent outlet vent that receives the airflow from said scent delivery unit and discharges the airflow into a space, said scent outlet vent including a fan that is operable to accelerate the airflow through said scent outlet vent.

10. The system defined in claim 9 wherein the operation of said fan is controlled by said controller.

11. The system defined in claim 1 wherein the scent delivery unit includes a plurality of compartments, each containing a scent cartridge, and wherein said mechanism selectively moves said scent cartridges from said compartments into said path so as to cause the airflow to flow through said scent cartridges and thereby release scents into the airflow to create a scented airflow, and wherein said controller is responsive to the timing signals of the presentation for controlling the operation of said scent cartridge moving mechanism to move each of said scent cartridges between said compartments and said path.

12. A method for delivering scents to an audience during a presentation containing timing signals comprising the steps of:

(a) providing a scent delivery unit including a compartment containing a scent cartridge, a path, and a device adapted to generate an airflow through the path;

(b) providing a mechanism for selectively moving the scent cartridge from the compartment into the path so as to cause the airflow to flow through the scent cartridge and thereby release scent into the airflow to create a scented airflow; and (c) providing a controller that is responsive to the timing signals of the presentation for controlling the operation of said scent cartridge moving mechanism to move said scent cartridge between said compartment and the path.

13. A method for delivering scents to an audience during a presentation comprising the steps of:

(a) providing timing signals on the presentation;

(b) providing a scent track containing signals that represent desired scents to be presented in correlation with predetermined portions of the presentation;

(c) delivering the scent track to a scent delivery unit;

(d) displaying the presentation;

(e) causing the scent delivery unit to sense the timing signals as the presentation is displayed; and (f) in response to the sensing of the timing signals, causing the scent delivery unit to present a scent to an audience during the presentation.

* * * * *